Patented May 8, 1945

2,375,572

UNITED STATES PATENT OFFICE 2,375,572

NEW PLASTIC COMPOSITIONS AND METHOD OF MAKING SAME

George D. Martin, Nitro, W. Va., assignor to Monsanto Chemical Company, St. Louis, Mo., a corporation of Delaware No Drawing. Application November 6, 1940, Serial No. 364,598

12 Claims. (Cl. 260—84.5)

This invention relates to new plastic products derived from synthetic rubber like materials and to the preparation of the same.

In accordance with this invention a synthetic rubber or elastomer, the latter term finding increasingly wider acceptance for materials possessing elastic properties such as characterize the natural rubbers, is treated with an organic phosphine halide belonging to the aromatic series of compounds. While the aromatic radical or radicals include those in which carbon is linked to phosphorus through an intermediary such as oxygen, sulfur, nitrogen, methylene and the like, it is preferred to employ a phosphine halide in which a carbon atom of an aromatic radical is attached directly to phosphorus. Of the halides, the chlorides, due to their cheapness and availability are preferred.

Any aromatic phosphine halide is suitable for the preparation of the new plastic and elastic products. As typical examples there may be mentioned the following but the invention is by no means limited thereto; phenyl dichlor phosphine, thiophendichlor phosphine, tolyl dichlor phosphine, 1,3,4-trimethyl phenyl dichlor phosphine, 1,3,5-trimethyl phenyl dichlor phosphine, xylyl dichlor phosphine, biphenyl dichlor phosphine, α-naphthyl dichlor phosphine, tetrahydro naphthyl dichlor phosphine, dichlor phosphine of meta diphenyl benzene, decyl phenyl dichlor phosphine, diethyl amino phenyl dichlor phosphine, dimethyl amino phenyl dichlor phosphine, tertiary butyl phenyl dichlor phosphine, ditolyl chlor phosphine, dixylyl chlor phosphine, tolyl dibrom phosphine, α-naphthyl dibrom phosphine, tolyloxy dichlor phosphine, α-naphthoxy dichlor phosphine, benzyl dichlor phosphine, phosphazobenzol cloride, diphenyl amino dichlor phosphine, thiophenyl dichlor phosphine, anisyl dichlor phosphine, phenetyl dichlor phosphine, meta and para hydroxy phenyl dichlor phosphine, chlor phenyl dichlor phosphine, bromphenyl dichlor phosphine, ethyl phenyl dichlor phosphine, dibenzyl dichlor phosphine, diphenyl methane dichlor phosphine and equivalents and analogues thereof.

The aromatic phosphine halides are a well known class of compounds so that reference may be had to the literature for the various methods available for their preparation. Such methods comprise reacting a phosphorus trihalide with a phenol, a thio phenol, an aromatic amine, aromatic hydrocarbon, etc. In the case of the preferred group wherein the phosphorus atom is linked directly to a carbon atom of an aryl group possible methods of synthesis comprise treating a diaryl mercury with $PCl_3$ or reacting a suitable aromatic compound with $PCl_3$ in the presence of a Friedel-Crafts catalyst.

As will appear presently there are certain advantages derived from employing a Friedel-Crafts synthesis. Reference may be had to Liebig's Annalen, vol. 212, p. 205–8, p. 236, and vol. 294, pages 2, 35 and 48 for further details. A description of the use of aromatic tertiary amines in the process may be found in Ann. 260, p. 34. However, it is to be understood that this invention is not limited to any particular method of making the organic phosphine halides.

The term "elastomer" is employed in the description and claims to refer to any synthetic rubber like material possessing elastic properties or in other words any material capable of regaining size and shape after distortion. Although it is not possible to state the nature of the change taking place other than by reference to the physical properties of the final products it is believed that they are reaction products of the elastomer and the phosphine halide since the hydrocarbon content of the final product is materially increased although the specific characteristics of the final products depend upon the reaction conditions, the proportion of reacting ingredient and the like. Among the most interesting and useful type of products are very tough rubber materials possessing increased modulus and hardness over the original elastomer. While products answering this description are obtainable from aromatic phosphine halides broadly products derived from phosphine halides in which phosphorus is attached to a carbon atom of an aryl group, in general exhibit greater stability.

There are numerous ways and means of effecting the reaction between an elastomer and the phosphine halide. It is even possible to treat an elastomer with a phosphine halide formed in situ but the reaction is then much more difficult to control and consequently the products are less easily reproduced. In general while it is desired to emphasize that the particular apparatus employed, the presence or absence of inert solvent, the temperature, time and the like are not critical in the sense of obtaining products within the scope of this invention although as noted these factors will influence the properties of the product, it is essential that the elastomer be brought into intimate and uniform association with the phosphine halide if it is expected to get reproducible results. To this end use of inert solvents is of considerable benefit but their elimination is of course desirable for reasons of economy. In the absence of a solvent the phosphine halide often makes the elastomer slimy and slippery during the early stages of the treatment so that thorough mixing is impeded. However, an efficient internal type mixer composed of corrosion resistant material such as stainless steel will give the proper association of the reactants. This may be of the W & P type or modifications thereof. A Banbury mixer is a further example of a suitable mixing apparatus. In any case there should be little or no free space above the mixer blades. Pre-plasticization of the elastomer before adding the phosphine halide will further facilitate the reaction. An ordinary rubber mill may be used but it is then necessary either to enclose the rolls and pass dry air or other dry inert gas through the enclosure or to work in a room of controlled low humidity in order to avoid undue hydrolysis of the phosphine halide. Once the elastomer and the phosphine halide have been thoroughly mixed so that the mass is homogeneous throughout it may be removed and placed in an ordinary oven to complete the reaction. However it should be remembered that some hydrogen chloride will be evolved so that precautions against corrosion are advisable.

While not necessarily essential the reactions are greatly facilitated by the incorporation of a small proportion of a Friedel-Crafts catalyst. In the case of phosphine halides involving a Friedel-Crafts synthesis in their preparation it has been found satisfactory and in fact advantageous to use the entire reaction mixture which of course already contains a catalyst so that additional catalyst is unnecessary, although more may be added where desired. However a certain amount of unreacted ingredients are ordinarily separated before reacting with the elastomer. After heating liquid aromatic hydrocarbons as for example xylene or toluene with a phosphorus trihalide in the presence of a Friedel-Crafts catalyst there separates after completion of the reaction a top layer consisting essentially of unreacted hydrocarbon and phosphorus halide which is simply drawn off and reserved for future preparations. The bottom layer contains the desired reaction product together with small proportions of unreacted materials, products from side reactions and most of the catalyst, the latter existing in the form of a complex organic addition product. It has been found that this crude mixture remaining after separation of the layer of unreacted materials is admirably suited for reacting directly with the elastomer without further treatment. This so called "bottom layer" will be designated hereinafter as "crude" reaction product. By way of example a typical preparation of crude tolyl dichlor phosphine is given below:

Into a suitable glass or glass lined reaction vessel fitted with a reflux condenser there was charged 600 parts by weight of toluene, 800 parts by weight of PCl$_3$ and 120 parts by weight of anhydrous aluminum chloride. The mixture was then heated to refluxing temperature at which temperature it was maintained for about 36 hours. HCl was evolved during the greater part of the heating. When cool the reaction mixture separated into two portions. The bottom layer amounting to substantially 840 parts by weight was drawn off and either immediately reacted or stored in moisture proof containers. In this connection tolyl dichlor phosphine and analogous materials are extremely sensitive to moisture and hydrolyze rapidly to the corresponding acids. Surprisingly however, the presence of small amounts of water during the reaction with the elastomer are not deleterious.

Obviously, aromatic compounds which are normally solids will not separate as an unreacted liquid layer and in such case the reaction mixture is preferably treated with an organic solvent such as petroleum ether, the extracts combined, the solvent removed and the residue employed as the reactant. While some unreacted aromatics and other materials are extracted along with the desired phosphine halide it has been found unnecessary to remove them. However, the catalyst is left behind in the discarded residue so that it is desirable to add a small proportion of Friedel-Crafts catalyst to promote the reaction with the elastomer.

*Example I*

A cement was prepared by dissolving 100 parts by weight of Neoprene type G a polymer of 2-chlorbutadiene in 1500 parts by weight of carbon disulfide or other inert solvent. The cement so prepared together with 50 parts by weight of crude tolyl phosphine dichloride and 2 parts by weight of anhydrous aluminum chloride was charged into a suitable reaction vessel fitted with a stirrer and reflux condenser. The charge was heated and stirred at refluxing temperature for about forty-eight hours or until HCl ceased to be evolved, after which heating was discontinued and the solvent removed preferably by distillation. The residue was thoroughly washed with water either on an ordinary rubber mill or on a mill having corrugated rolls or on other equipment adapted for washing tough plastic products. The washed product was dried by heating on a hot mill as for example at 70° followed by heating to constant weight in a vacuum oven at 60–75° C. In this manner there was obtained 121 parts by weight of a tough rubber product possessing properties hereinafter described in greater detail.

*Example II*

100 parts by weight of Neoprene type GW a polymer of 2-chlorbutadiene was substituted for the Neoprene in the procedure described in Example I. There was obtained 120.5 parts by weight of a tough rubber product.

As illustrative of the properties of the Neoprene products described in the foregoing examples stocks were compounded comprising

|  | Stocks | | | |
|---|---|---|---|---|
|  | A | B | C | D |
|  | Parts by weight | Parts by weight | Parts by weight | Parts by weight |
| Product of Example I | 100 | | | |
| Neoprene type G | | 100 | | |
| Product of Example II | | | 100 | |
| Neoprene type GW | | | | 100 |
| Zinc oxide | 5 | 5 | 5 | 5 |
| Light calcined magnesia | 4 | 4 | 4 | 4 |
| P-33 carbon black | 28.8 | 28.8 | 28.8 | 28.8 |
| Stearic acid | 0.5 | 0.5 | 0.5 | 0.5 |

The stocks so compounded were cured by heating for thirty minutes at the temperature of forty pounds steam pressure per square inch and various physical properties determined, the results of which are summarized below:

| Stock | Hardness | Modulus of elasticity at an elongation of 200 per cent | Ultimate elongation, per cent |
|---|---|---|---|
| A | 67 | 825 | 340 |
| B | 51 | 248 | 895 |
| C | 65 | 780 | 520 |
| D | 55 | 351 | 900 |

In addition the reaction products of the Neoprenes and tolyl phosphine dichloride are more resistant to solvents than the Neoprenes themselves. For example stock D exhibited 14% swelling by volume in kerosene in thirty hours at room temperature as compared to 8% swelling of the C stock under similar conditions.

*Example III*

A cement was prepared by dissolving 100 parts by weight of Vistanex (polybutylene) in 1500 parts by weight of carbon disulfide or other inert solvent. The cement so prepared together with 50 parts by weight of crude tolyl phosphine dichloride and 2 parts by weight of anhydrous aluminum chloride were charged into a suitable reaction vessel fitted with a stirrer and reflux condenser. The charge was heated and stirred at refluxing temperature for forty-eight hours or until HCl ceased to be evolved after which heating was discontinued and the solvent removed preferably by distillation. The residue was washed and dried to constant weight all substantially as described in Example I to obtain 115 parts by weight of a nearly white rubbery product which required no curing or vulcanization step to impart useful properties of commercial interest. For example the product possessed appreciable toughness and tear resistance whereas Vistanex could be easily pulled apart by hand.

*Example IV*

100 parts by weight of Perbunan, a mixed polymer of butadiene and acrylic nitrile, was softened by soaking for several hours in a suitable solvent as for example cutting into small pieces and soaking for twelve hours in carbon disulfide. The softened product containing entrained solvent was charged into a stainless steel mixer of suitable capacity fitted with a reflux condenser. 50 parts by weight of crude tolyl phosphine dichloride was added over a period of about an hour at 40-47° C. After a total heating of about four hours at this temperature, the temperature was raised to 70° C. until the evolution of HCl had substantially ceased. A Liebig type condenser was then substituted for the reflux condenser and the solvent was distilled off. The temperature was then raised to 100° C. for about thirty minutes and the charge cooled and washed with water as completely as possible before removing from the mixer. The product was then washed on corrugated rolls and dried to constant weight all substantially as described in Example I to obtain approximately 110 parts by weight of a tough rubbery product. 100 parts by weight of this product compounded with 45 parts of Gastex, 5 parts zinc oxide, 2.5 parts stearic acid, triphenyl phosphate 2.0 parts, sulfur 1.0 part and mercaptobenzothiazole 1.5 parts provided a stock which cured nicely in 15 minutes at the temperature of 40 pounds of steam pressure per square inch.

Again this invention is not limited to the specific examples set forth to illustrate the invention. Other synthetic rubbery materials may be employed than those specifically mentioned. In a prior application of George D. Martin, Serial No. 346,991, filed July 23, 1940, there is disclosed the reaction products of natural vulcanizable hydrocarbon gums and the phosphine halides herein defined it being there pointed out that the reaction was applicable to any hydrocarbon gum possessing chemical unsaturation. However as shown by the foregoing disclosure the reaction is limited neither to hydrocarbon gums nor to gums possessing chemical unsaturation. It is to be understood therefore that this invention pertains to all types of products possessing elastic properties, as for example Koroseal (a plasticized vinyl chloride), polymers of acrylic acid and methacrylic acid esters, isobutylene polymers, butadiene polymers and co-polymers such as Buna rubber a polymer of butadiene-1,3 and Buna S a co-polymer of butadiene-1,3 and styrene, isoprene polymers, Thiokol, Neoprene, polymerized cashew nut oil, olefine polysulfide plastics, 2,3 dimethyl butadiene polymers, 2 phenyl butadiene polymers, dichlor butadiene polymers and elastomers from other polymerizable materials and mixtures, such as mono- and di-olefine copolymers.

Other inert solvents may be used in the preparation of preferred materials than those specifically mentioned as well as other Friedel-Crafts catalysts as for example ferric chloride, stannic chloride and the like. Other organic phosphine halides belonging to the aromatic series of compounds may be employed. In the case of preferred phosphine halides or more particularly those in which an aromatic radical is attached directly to phosphorus, the presence of at least one lower alkyl radical in the aryl group is desirable. It appears that aryl radicals containing alkyl substituents up to about four carbon atoms provide phosphine halides of marked activity. Other fillers and compounding ingredients than those shown in the particular compositions described may be utilized and the preferred materials admixed with other plastic or resinous products. This invention is limited solely by the claims attached hereto as part of the present specification.

What is claimed is:

1. A new composition of matter obtained by heating until the evolution of HCl has ceased a rubber-like polymer of chlor butadiene with crude tolyl dichlor phosphine.

2. A new composition of matter obtained by heating until the evolution of HCl has ceased a rubber-like co-polymer of butadiene and acrylic nitrile with crude tolyl dichlor phosphine.

3. The method of making a new product which comprises heating until the evolution of HCl has ceased a rubber-like polymer of chlor butadiene with crude tolyl dichlor phosphine.

4. The method of making a new product which comprises heating until the evolution of HCl has ceased a rubber-like co-polymer of butadiene and acrylic nitrile with crude tolyl dichlor phosphine.

5. The composition of matter obtained by heating until the evolution of HCl has ceased an elastic conjugated butadiene polymer selected from the class consisting of butadiene, isoprene, 2,3 dimethyl butadiene, 2-phenyl butadiene, 2-chlor butadiene, dichlor butadiene, butadiene-acrylic nitrile copolymers and butadiene-styrene copolymers with an organic phosphine halide belonging to the aromatic series of compounds having at least one aromatic group and at least one halogen atom directly attached to the phosphorus.

6. The composition of matter obtained by heating until the evolution of HCl has ceased an elastic conjugated butadiene polymer selected from the class consisting of butadiene, isoprene, 2,3 dimethyl butadiene, 2-phenyl butadiene, 2-chlor butadiene, dichlor butadiene, butadiene-acrylic nitrile copolymers and butadine-styrene copolymers with a compound possessing the structure

where R is an organic radical belonging to the aromatic series in which a carbon is attached directly to the phosphorus and x and y are halogen.

7. The composition of matter obtained by heating until the evolution of HCl has ceased an elastic conjugated butadiene polymer selected from the class consisting of butadiene, isoprene, 2,3 dimethyl butadiene, 2-phenyl butadiene, 2-chlor butadiene, dichlor butadiene, butadiene-acrylic nitrile copolymers and butadiene-styrene copolymers with an aryl dichlor phosphine having a carbon atom of the aryl group and two chlorine atoms directly attached to the phosphorus.

8. The composition of matter obtained by heating until the evolution of HCl has ceased an elastic conjugated butadiene polymer selected from the class consisting of butadiene, isoprene, 2,3 dimethyl butadiene, 2-phenyl butadiene, 2-chlor butadiene, dichlor butadiene, butadiene-acrylic nitrile copolymers and butadiene-styrene copolymers with tolyl dichlor phosphine in the presence of anhydrous aluminum chloride.

9. The method of making a new product which comprises heating until the evolution of HCl has ceased an elastic conjugated butadiene polymer selected from the class consisting of butadiene, isoprene, 2,3 dimethyl butadiene, 2-phenyl butadiene, 2-chlor butadiene, dichlor butadiene, butadiene-acrylic nitrile copolymers and butadiene-styrene copolymers with an organic phosphine halide belonging to the aromatic series of compounds having at least one aromatic group and at least one halogen atom directly attached to the phosphorus.

10. The method of making a new product which comprises heating until the evolution of HCl has ceased an elastic conjugated butadiene polymer selected from the class consisting of butadiene, isoprene, 2,3 dimethy butadiene, 2-phenyl butadiene, 2-chlor butadiene, dichlor butadiene, butadiene-acrylic nitrile copolymers and butadiene-styrene copolymers with a compound possessing the structure

where R is an organic radical belonging to the aromatic series in which a carbon is attached directly to the phosphorus and x and y are halogen.

11. The method of making a new product which comprises heating until the evolution of HCl has ceased an elastic conjugated butadiene polymer selected from the class consisting of butadiene, isoprene, 2,3 dimethyl butadiene, 2-phenyl butadiene, 2-chlor butadiene, dichlor butadiene, butadiene-acrylic nitrile copolymers and butadiene-styrene copolymers with an aryl dichlor phosphine having a carbon atom of the aryl group and two chlorine atoms directly attached to the phosphorus.

12. The method of making a new product which comprises heating until the evolution of HCl has ceased an elastic conjugated butadiene polymer selected from the class consisting of butadiene, isoprene, 2,3 dimethyl butadiene, 2-phenyl butadiene, 2-chlor butadiene, dichlor butadiene, butadiene-acrylic nitrile copolymers and butadiene-styrene copolymers with tolyl dichlor phosphine in the presence of anhydrous aluminum chloride.

GEORGE D. MARTIN.